(12) United States Patent
Johnstone

(10) Patent No.: US 6,383,430 B1
(45) Date of Patent: May 7, 2002

(54) METHOD FOR PRODUCING STRETCH WRAP PLASTIC FILM

(75) Inventor: Peter Johnstone, Reservoir (AU)

(73) Assignee: First Green Park PTY, Ltd., Victoria (AU)

( * ) Notice: Subject to any disclaimer, the term of this patent is extended or adjusted under 35 U.S.C. 154(b) by 0 days.

(21) Appl. No.: 09/403,960

(22) PCT Filed: May 1, 1998

(86) PCT No.: PCT/AU98/00314

§ 371 Date: Nov. 1, 1999

§ 102(e) Date: Nov. 1, 1999

(87) PCT Pub. No.: WO98/50219

PCT Pub. Date: Nov. 12, 1998

(30) Foreign Application Priority Data

May 1, 1997 (AU) ................................................ P06563

(51) Int. Cl.⁷ .......................... A01F 25/13; B28B 11/16; B29C 55/06; B65B 53/02
(52) U.S. Cl. ...................... 264/146; 53/441; 264/289.6; 264/342 RE; 428/220
(58) Field of Search .............................. 264/146, 289.6, 264/342 RE; 428/220; 53/441

(56) References Cited

U.S. PATENT DOCUMENTS

| | | | |
|---|---|---|---|
| 2,307,056 A | 1/1943 | Minich | |
| 4,413,463 A | 11/1983 | Lancaster | |
| 4,436,888 A | 3/1984 | Copple | |
| 4,712,686 A | 12/1987 | Lancaster et al. | |
| 4,816,094 A | * 3/1989 | Pomplun et al. | .. 264/342 RE X |
| 5,634,321 A | 6/1997 | Martin-Cocher et al. | |
| 5,716,570 A | * 2/1998 | Peiffer et al. | ................ 264/146 |
| 5,797,240 A | 8/1998 | Martin-Cocher et al. | |

FOREIGN PATENT DOCUMENTS

| | | |
|---|---|---|
| AU | 19501/92 B | 11/1993 |
| EP | 0 614 810 A1 | 9/1994 |
| WO | WO 89/06594 A1 | 7/1989 |
| WO | WO 95/13965 A1 | 5/1995 |

* cited by examiner

Primary Examiner—Leo B. Tentoni
(74) Attorney, Agent, or Firm—Alston & Bird LLP

(57) ABSTRACT

The present specification discloses a plastics material film (1) that is stretched beyond its yield point to about 100% to 400% elongation and thereafter only partially relaxed to release part of the elastic deformation component in the film to retain between about 20% and 80% of the elastic deformation in the film (1), the film thereafter being stored in this partially relaxed state whereby, when it is used, the retained elastic deformation capability is useable for the intended purpose of the film, for example, wrapping a load.

7 Claims, 3 Drawing Sheets

METHOD FOR PRODUCING STRETCH WRAP PLASTIC FILM

FIELD OF THE INVENTION

The present invention relates to a method and process for producing stretch wrap plastic film and in particular, the storage of such plastic film which has undergone stretching prior to storage on a roll.

SUMMARY OF PRIOR ART

In German laid open specification P3409117 there is disclosed a process for wrapping packaged goods in a web shaped stretch film wherein the film is provided in an already stretched state rolled up under tension; with the stretching taking place during the actual manufacture or as an intermediate step after processing of the film. In other words, in any film that has been stretched before storage, it is possible to store the film in its tensioned stretch state without allowing it to relax.

In this way, it is possible for the film to do work so that the retained tension in the film will act on a load or package with the film relaxing to a steady state when wrapped around a load or package. In the arrangement disclosed, it is necessary to avoid over stretching of the film and it may be necessary to apply adhesive to the stored film to avoid unwinding or recoiling of the film. Furthermore, it has been found that the relatively high stored tension in the roll may cause the core of the roll to collapse.

In Australian Patent No. 643902 there is disclosed a method and apparatus for making pre-stretched film from molten stock material, cooling the film, stretching the cooled film beyond the yield point and substantially relaxing the film to reduce the tension therein. It is disclosed that the major benefit achieved by this method and apparatus is that the film has been cold-oriented and relaxed to obtain a reduced web thickness and that the film does not need to be stretched as it is applied to an external configuration such as a load to obtain any savings of material. The film has merely to be tightened around a load upon application thereby providing better load containment than similar hand wrapped applications of prior art films.

In Australian Patent Application No. 55564/94 there is disclosed the provision of a roll of stretched plastics material film which has an embossed surface for trapping air so as to facilitate unwinding of the roll of stretched film for wrapping pallet loads. The film is totally relaxed prior to winding on to the storage roll.

SUMMARY OF THE INVENTION

The present invention seeks to minimise the perceived disadvantages of the known prior art and has as its primary objective the provision of a method for making a stretched film product where the stretched film is easier to use as a wrapping medium either for industrial, commercial or agricultural wrapping applications including for use in the making of silage.

Accordingly, the present invention provides a method of making stretch film including the steps of stretching the film beyond its yield point to an elongation greater than 100%, removing opposed edge zones of the stretched film to produce a film having a substantially uniform thickness, allowing the film to partially relax to release part of the elastic deformation component in the film to retain between about 20% and 80% of the elastic deformation, and storing the partially relaxed film for future use in the partially relaxed state.

Preferably the stretching of the film beyond its yield point may be in the range of 100% to about 400% of its original length. Conveniently this stretching may occur at or very shortly after the manufacture of the film in an extrusion machine so that the film is stored for later use in at least a partially stretched condition. It has been found that stretching of the film beyond its yield point causes distortions at marginal edge regions of the film which tend to form thickened areas compared with the main body of the stretched film web. These thickened edge portions cause a soft or spongy central zone once the film is wound up on a storage core that may inhibit maintenance of the retained degree of elastic deformation. Moreover, in the stored state the thickened edge portions tend to interact in overlapping film layers so as to inhibit correct dispensing of the film when it is desired to be used. It is therefore of importance to remove sufficient of the lateral ledge zones to produce a film of substantially uniform thickness. In this state the overlapping edge portions in the stored state do not interact with one another.

The present invention requires the retention of between 20% and 80% of the elastic deformation in the film after the stretching to at least 100% of its original length. More preferably between 40% and 70% of the elastic deformation is retained. The lower limit of 20% represents a minimum amount of useable elastic stretch being retained for effective wrapping of a load without the application of excessive further stretching loading during a wrapping action, that is during dispensing of the film from the stored state. The upper limit of 80% of the elastic deformation represents the maximum amount of stretch that can be retained while still being able to avoid damage to supporting cores on which the film is stored and telescoping of the film during storage.

In one specific preferred aspect, the film may be produced as a tube in an extruder of known construction and procedure and after cooling is stretched prior to cutting the tube to form webs of predetermined width and at predetermined retained memory or elastic deformation in the stretch procedure which can then be stored for later re-use.

The present invention also anticipates providing a stretch plastics material film made by any of the aforesaid methods.

In another preferred aspect, there is provided a method of wrapping a load with plastics material film including providing plastics material film stretched beyond its yield point which in a stored state retains between 20% and 80% of the film's elastic deformation capability, and thereafter wrapping said film about said load. The load may be any product or material that requires wrapping but can include pallet wrapping, vegetation material during the production of silage, and bundle wrapping applications such as timber lengths, cans including drink cans and any other similar product. Wrapping of the load may be achieved by storing the plastics material on a roll capable of use in either a manually handled wrapping machine, or a powered wrapping machine of any conventional configuration. The advantage achieved is that the force required to establish a required elastic loading on the load to be wrapped is substantially reduced because of the retained elastic deformation levels in the plastics film.

In a still further aspect of this invention there is provided a method of dispensing a plastics material film including providing a plastics material film stretched beyond its yield point which in a stored state retains between 20% and 80% of the film's elastic deformation capability, and thereafter dispensing said film from the stored state.

Conveniently in both the preceding aspects, the plastics material film prior to being stored in said stored state is stretched beyond its yield point in the range of about 100% to 400% elongation.

BRIEF DESCRIPTION OF THE DRAWINGS

The invention will now be described in greater detail with reference to examples and a preferred embodiment shown in the accompanying drawings in which.

DETAILED DESCRIPTION OF PREFERRED EMBODIMENTS

Figure 1:
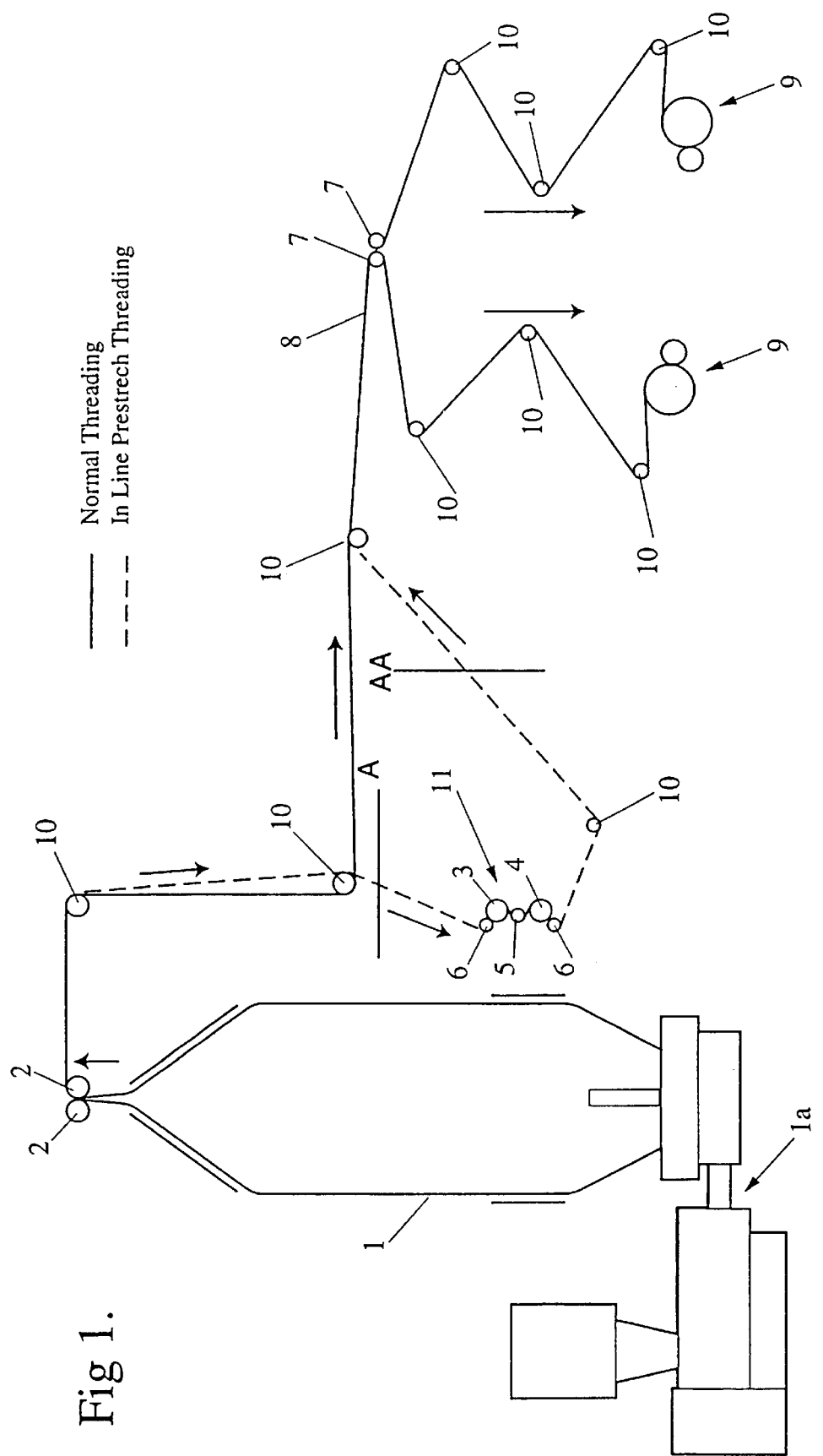
FIG. 1 shows schematically a stretch film production machine using an extrusion method, and a means for modifying this conventional arrangement to achieve in-line stretching of the film.

With reference to FIG. 1, an extruder 1(a) operates in known manner to generate an inflated film "bubble" 1 which is drawn up from the extruder to a great height in a cooling phase and then passed through a primary nip formed by nip rollers 2 to collapse the "bubble" whence it is passed to a secondary nip formed by nip rollers 7 via a film trimming and/or splitting station 8 or alternatively, to a stretching station A–AA comprised of several stretching and, if desired, web width adjustment rollers.

The extrusion line including the extruder 1(a) operates in a substantially continuous manner as a blown film line where film is fed to the secondary nip rollers 7 running at approximately the same speed as the primary nip rollers 2.

There may be in some instances as desired, a slight relaxation of the film between the primary top nip rollers 2 to film winding rollers 9 located after the secondary nip rollers 7 of between 1% to 2% to reduce any tension in the film during the winding process.

The tube may be separated with the two external edges of the film being trimmed when passing the trimming station 8 at or just prior to the secondary nip rollers 7 to form two separate film sheets. Further film splitting can occur at station 8 or subsequently prior to the film winding rolls 9 to provide differing film strip widths.

In accordance with one preferred aspect of the present invention, an in-line stretching unit 11 is provided as shown at A–AA of FIG. 1. The unit 11 may be interposed after the primary nip rollers 2 and before the secondary nip rollers 7 as shown. Thus, the stretch unit may be an optional add on feature of a conventional extrusion machine and the unit is suitable for dual operation with or without in-line stretch of the film.

Figure 2:
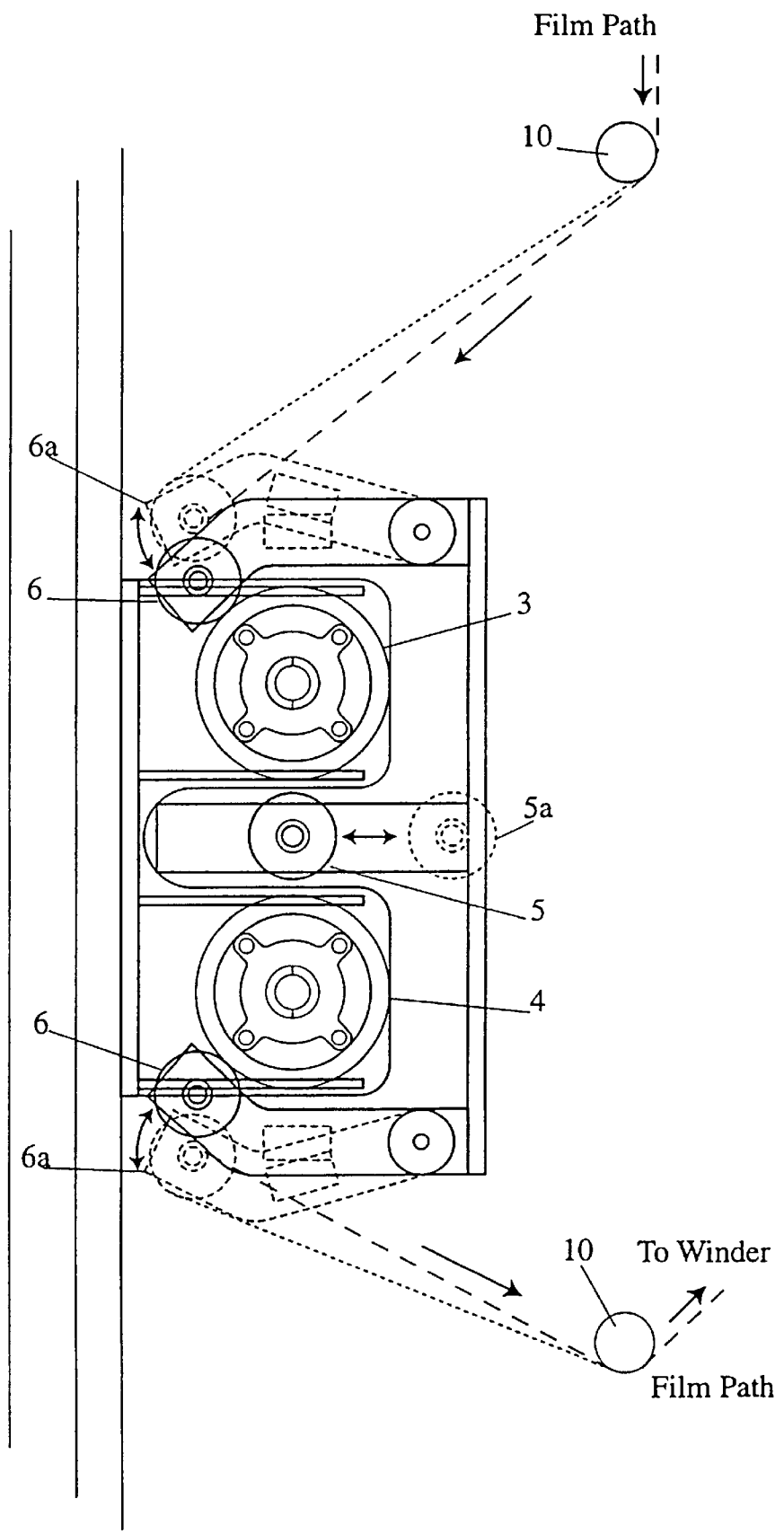
FIG. 2 shows in side elevation details of apparatus for stretching plastics material film as may be used in this invention.

In operation of the in-line stretch unit the film is threaded around the low speed stretching roll 3, the high speed stretching roll 4 and then back to the idler rolls 10 and thence to the secondary nip rollers 7. With reference to FIG. 2 of the drawings, the idler nip rolls 6 in the stretch unit are adjustable to an open position 6(a) to allow easy threading of the film therethrough. The nip rolls 6 may be left in the open disengaged position 6(a) whilst the extruded "bubble" of film is established and correct film thickness of say 25 microns at a lay flat tube width of 1,900 mms is produced. The idler roll 6 can then be moved to the closed or engaged position with the low speed stretch roll 3 and the high speed stretch roll 4.

A web width adjustment roller 5 may also be provided which is adjustable between various positions, for example as shown at 5(a). The adjustment is dependent upon the amount of "neck down" imparted to the film which in turn impacts directly upon the properties of the stretched film.

Figure 3:
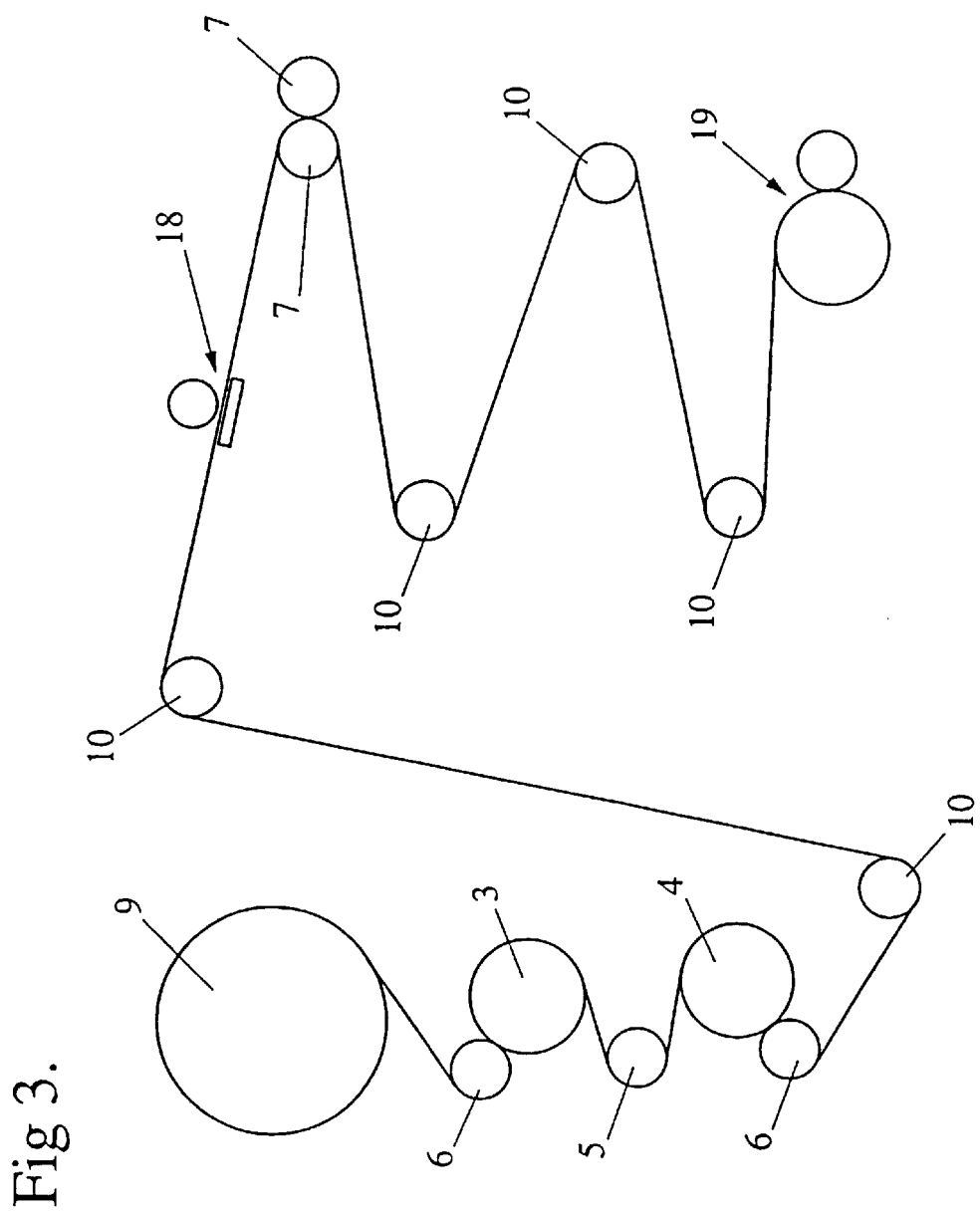
FIG. 3 shows schematically a non-in-line arrangement for stretching plastics material film in accordance with this invention.

In accordance with a further preferred aspect of this invention there is provided a non-in-line stretching unit which may take a roll of plastics material stretch film 9 such as might be produced by a conventional extrusion line shown schematically in FIG. 1 and at any time there after stretch same as illustrated schematically in FIG. 3. The film is passed through a stretching unit 11 which may be similar to that shown in FIGS. 1 and 2. The unit 11 includes a low speed roller 3 and a high speed roller 4 with stretching of the film 9 beyond its yield point generally occurring between these two rollers. The secondary nip rollers 7 are driven at a speed similar to the high speed roller 4 with partial relaxation occurring between the rollers 7 and a wind-up roller 19 such that partial elastic deformation in the range of between 20% and 80% is retained in the film. Stretching of the film beyond its yield point has been found to create a non-uniform thickness transversely across the width of the film web. More particularly thickened edge portions are created with a wide central zone of substantially uniform thickness reduced from the thickness of the film before stretching. Thickened edge zones make it quite difficult for such film to be wound up onto a roll and therefore, a preferred aspect of this invention is to remove these thickened edge portions to provide a film web of substantially reduced and uniform thickness across its width. To this end a cutting station 18 is provided to remove the edge regions of the stretched film. If it is desired to cut the film into a number of strands of different widths, this may also occur at the cutting station 18 or at a subsequent cutting station before the wind-up roller 19.

The pre-stretching process will be described with reference to the following examples when having reference to the accompanying FIGS. 1 and 2 wherein the plant is operating as already described above.

EXAMPLE 1

The approximate speed of the film travel is 100 meters per minute producing a 25 micron film thickness at a lay flat tube width of 1,900 mm. The primary nip rollers 2 and the low and high speed stretch rollers 3, 4 initially are operated at the same speed of approximately 100 meters per minute. In this format, the tube is wound on the wind up rolls 9 after the edges are trimmed at edge trim station 8.

The stretching operation can now be commenced with the low speed stretch roller 3 maintaining a similar speed as primary nip rollers 2 and the high speed stretch roller 4 and following secondary nip rollers 7 and the winding rollers 9 accelerating to the desired speed to achieve the predetermined amount of stretch and relaxation desired. To ensure correct levels of stretch and relaxation it may be preferable to measure the actual film speed rather than roller speed to guard against the effects of any film slippage on the rolls. For example, pre-stretching the film to 200% elongation with approximately 50% of elastic deformation being left on the roll is achieved by accelerating the high speed roller 4 to 300 meters per minute with the film winding roller 9 being accelerated to a lesser extent of approximately 270 meters per minute. The formula to achieve the correct speed of the winding roller 9 is as follows 100 meters/minute+(200 meters/minute×85%)=270 meters/minute.

Given that 30% of total deformation (200%) of the plastics material is elastic or recoverable if the film is relaxed, this represents a 50% relaxation of the film as it is wound on to the film winding roller 9. Putting it another way, the film is stored with 50% of the elastic deformation of the film still available to do work or to be released. Obviously the stretched film may be further elongated at this stage.

When a film is stretched 200% that is:

1 m to 3 m

Total Deformation: 2 m which is divided between plastic deformation and elastic deformation.

Therefore,

Total Deformation=plastic deformation and elastic deformation.

In the above case:

Plastic Deformation: 70%

Elastic Deformation: 30%

It will be appreciated that these ratios may vary without departing from the scope of the invention.

Therefore, to achieve a stretch film storage with the above parameters, requires roll speeds as follows:

Primary nip rollers 2: 100 meters/minute

Low speed stretch roller 3: 100 meters/minute±1–2%

High speed stretch roller 4: 300 meters/minute

Film winding roller 9: 270 meters/minute

Furthermore, it will be feasible to use the secondary nip roller 7 at slightly less than 270 meters per minute to create tension through the winding roller 9 to minimise possible production problems of film wrap around in the wind up of the film.

EXAMPLE 2

Primary nip rollers 2: 70 meters/minute

Low speed stretch roller 3: 70 meters/minute

High speed stretch roller 4: 245 meters/minute giving a 250% elongation

Secondary nip rollers 7: 215 meters/minute giving a 207% elongation

Film winding roller 9: 218.75 meters/minute giving a final elongation of 212.5%.

With control of the film speed parameters, it is possible to have elastic deformation retained in the range of about 20% to about 80% with the upper limit depending upon the core used to store the rolled film. It has been found that retained elastic deformation in the range of 40% to 60% provides excellent results.

It is possible to produce pre-stretched rolls at varying widths as follows:

(a) Producing full width pre-stretched rolls as described which are transferred to a secondary re-winder (not shown) and slitting the rolls to required width and then re-winding to an appropriate length, for example 400 meter hand rolls and 2,000 meter machine rolls at a width of 500 mm.

(b) Producing a full width pre-stretched lay flat tube re-winding the dual webs after separation of the two webs and winding each web at a separate re-wind station out of line after trimming of the edges.

(c) Producing a single or dual or lay flat tube unstretched on line and then automatically stretching on to a rewinder to produce rolls as in (a) or (b).

It has been found that utilising pre-stretched film that has been only partially relaxed will achieve the same wrapping forces on a load but requires less force to be applied to the film thereby minimising the possible tearing or puncturing of the film in the stretch application. That is, less force is required to be applied to the pre-stretched film than if it has been totally relaxed or not pre-stretched.

For example, a 1 meter to 3 meter stretch relaxed to 2.7 meters and then stretched back to 3 meters requires force X.

1 meter to 3 meter stretch relaxed to 2.4 meters (totally relaxed) to stretch back to 3 meters requires a force of X plus Y which force is greater than force X.

Production of partially relaxed film will impart greater versatility and breadth of application to various loads.

Such a partially relaxed film may be wrapped around a desired product or load without further stretching at the point of wrapping and in which case the retained elastic capability can be used to provide the required retaining force for the load. A partially relaxed film in accordance with the present invention may be further stretched (or restretched) to attain the original level of stretching or in some cases even beyond the original level of stretching but this will require more force than that which would have been required during the original stretching process.

The stretched film can be used in various non wrapping applications, for example police tape where tension in the film would be a clear advantage.

The claims defining the invention are as follows:

1. A method of making stretch film including the steps of uniaxially stretching the film beyond its yield point to an elongation greater than 100%, removing opposed edge zones of the stretched film to produce a film having a substantially uniform thickness, allowing the film to partially relax to release part of the elastic deformation component in the film to retain between about 20% and 80% of the elastic deformation, and storing the partially relaxed film for future use in the partially relaxed state.

2. A method of making stretch film according to claim 1, wherein the film is stretched beyond its yield point to an elongation within the range of 100% to about 400%.

3. A method of making stretch film according to claim 1, wherein the film is stored retaining between 40% and 70% of the elastic deformation.

4. A method of making stretch film according to claim 1 or claim 2, wherein the steps of the film being stretched beyond its yield point and then being partially relaxed occur in line.

5. A stretch film made in accordance with the method as claimed in claim 1.

6. A method of wrapping a load, said method including providing a stretch film as defined in claim 5, and dispensing said film from the stored state while wrapping same about the load.

7. A method according to claim 6, wherein the load is vegetation material.

* * * * *